(No Model.)

A. GIBEAULT.
HAY PRESS.

No. 561,882.            Patented June 9, 1896.

Witnesses:
Alf. Walter
H. Duvier

Arthur Gibeault
Inventor
per: J. Emile Vanier
Attorney.

ANDREW B. GRAHAM, PHOTO-LITHO, WASHINGTON, D.C.

United States Patent Office.

ARTHUR GIBEAULT, OF ST. ISIDORE JUNCTION, CANADA, ASSIGNOR TO JOHN HENRY WILSON, OF MONTREAL, CANADA.

HAY-PRESS.

SPECIFICATION forming part of Letters Patent No. 561,882, dated June 9, 1896.

Application filed February 12, 1896. Serial No. 579,042. (No model.)

*To all whom it may concern:*

Be it known that I, ARTHUR GIBEAULT, a citizen of the Dominion of Canada, residing at St. Isidore Junction, in the county of La-prairie and Province of Quebec, Canada, have invented certain new and useful Improvements in Hay-Presses; and I do hereby declare the following to be a full, clear, and exact description of the invention, such as will enable others skilled in the art to which it appertains to make and use the same.

My invention has reference to that class of hay-presses which are operated by an ordinary horse-power and in which the hay is pressed by the action of a square plunger working in a square bale-box and pressing the hay against blocks inserted into this box at each bale.

My invention has for its object to provide a hay-press of more rapid operation and taking less hands to attend to it.

Figure 1:
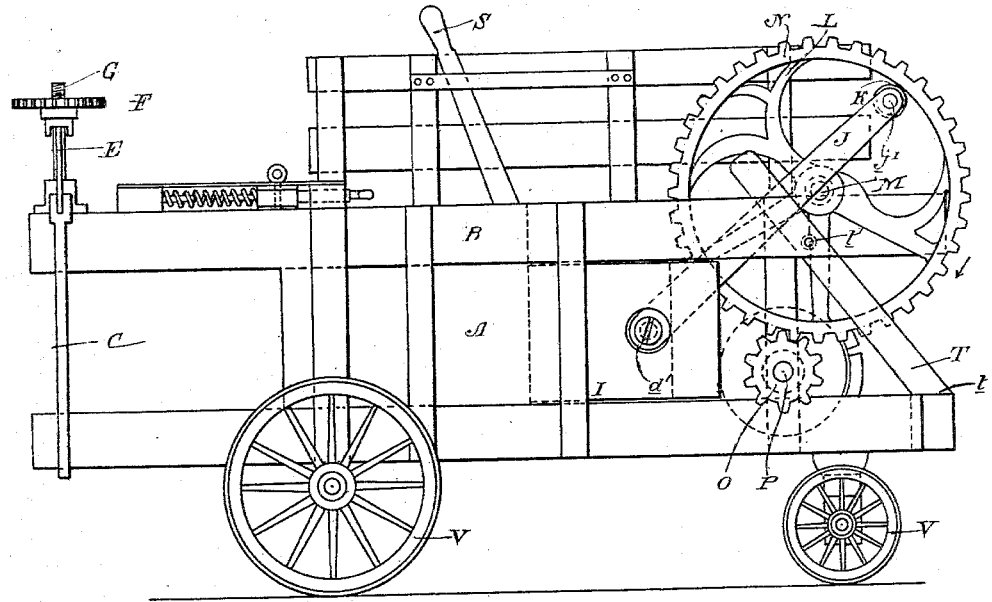
Figure 2:
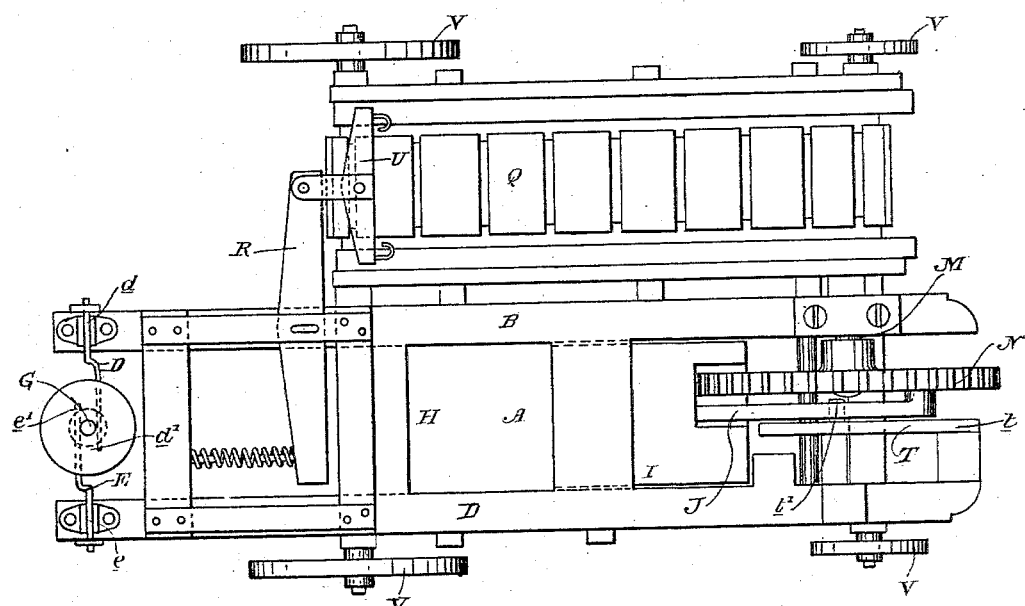

Figure 1 is a side view, and Fig. 2 a plan view.

There is nothing new about the frame of the bale-box A, which simply consists of four strong timbers B, well framed together and having the piece C connected to the two levers D and E, fulcrumed at $d$ and $e$ and having their ends $d'$ and $e'$ secured under the hand-wheel F, which works up and down on the screw G, thus closing in or rather approaching toward each other the top and bottom timbers B, and consequently top and bottom of the bale-box, or increasing the space between them at will simply by screwing down the hand-wheel F or unscrewing it. However, there is nothing new in this, and the object is to subject the ordinary separating-blocks inserted into the bale-box A through the opening H between each bale to more or less friction and thus press the bale to any degree desired.

I is the plunger, which is joined to the pitman J at $i'$, and has a reciprocating motion in the bale-box A given to it by the pitman J, which has the roller K, mounted on a projected pin at its extremity $j'$, arranged to run inside the cam L, having the configuration shown on the drawings—that is, an eccentric groove and cast in the gear-wheel N, which is keyed to the shaft M and intermeshing with the driving-pinion O, keyed to the shaft P, which is also the main shaft of the ordinary horse-power Q, so that any motion of the latter is transmitted to the hay-press by the shaft P. This horse-power is horizontal and the horses made to pull on it by being harnessed to the whiffletree U and lever R.

S is the lever of an ordinary brake, in which there is nothing new, and is consequently not shown.

The whole apparatus is mounted on wheels V, so as to be easy of transportation.

T is a guide, firmly secured at $t$ to the frame of the bale-box and serves to keep the pitman in place, it being provided with the pin $t'$ to allow the latter to rest on it when in its lowest position.

The shaft M is arranged above the top of the bale-box. When the plunger rebounds, it assumes the position shown in Fig. 1, and when the cam L strikes the roller K it pushes it downward and rearward. The downward motion of the pitman being limited by the pin $t'$, the plunger is constrained to move for a considerable distance rearwardly and compresses the hay in the press or bale-box.

What I claim is—

In a hay-press, the combination, with a bale-box, a slidable plunger, and a pitman pivoted to the plunger and provided with a roller at its free end; of the revoluble eccentric-cam L having its center above the top of the bale-box, and a stationary guide-pin $t'$ arranged in the downward path of the pitman and constraining the plunger to move rearwardly in the bale-box, substantially as set forth.

In testimony whereof I affix my signature in presence of two witnesses.

ARTHUR GIBEAULT.

Witnesses:
SIMEON LETOURNEAU,
F. E. ARNOULD.